(No Model.)

C. DESHLER.
RADIOMETER.

No. 454,719. Patented June 23, 1891.

Witnesses
Joseph Sullivan

Charles Deshler, Inventor
By his Attorney

UNITED STATES PATENT OFFICE.

CHARLES DESHLER, OF NEW BRUNSWICK, NEW JERSEY.

RADIOMETER.

SPECIFICATION forming part of Letters Patent No. 454,719, dated June 23, 1891.

Application filed August 6, 1890. Serial No. 361,151. (No model.)

*To all whom it may concern:*

Be it known that I, CHARLES DESHLER, of New Brunswick, State of New Jersey, have invented a new and useful Improvement in Radiometers, of which the following is such a full, clear, and exact description as will enable others skilled in the art to which this most nearly appertains to make and use the same when taken in connection with the accompanying drawings, in which—

Figure 1:
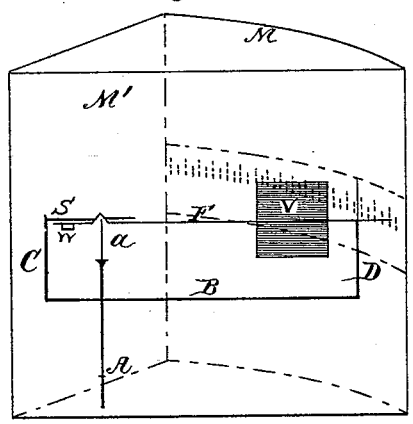
Figure 3:
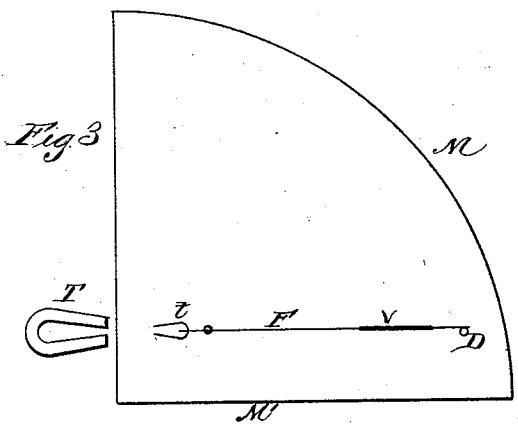
Figure 2:
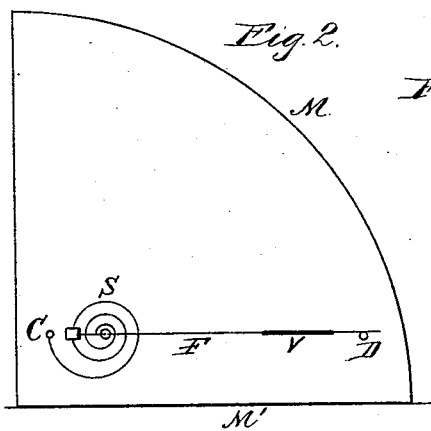
Figure 4:
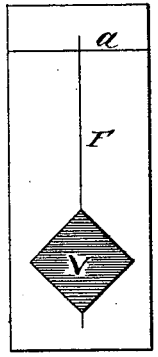
Figure 5:
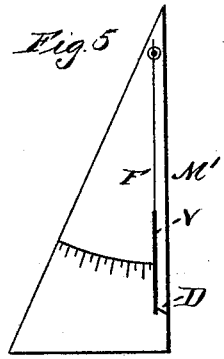

Figure 1 is a face view. Fig. 2 is a top view. Fig. 3 is a top view of a modification. Fig. 4 is a face view of another modification. Fig. 5 is a side view of the same.

This my invention relates to the method of measuring the rays of heat or light and the radiometer or machine to accomplish the measurement; and it consists of a machine having a vane sensitive to the rays of heat or light suspended on an arm impelled to resist the force of the rays and the various combinations hereinafter specified and claimed.

I will now proceed to describe the apparatus I use in carrying out my invention, as shown in Figs. 1 and 2. The standard A is fixed, and has rigidly attached to it the frame B, which has on it the stop D and the upright C, to which the spring S is attached, and the spindle $a$, on which the needle or vane-arm F rests. The arm F has at or near one end of it the vane V, and at or near the other end the counter-weight $w$, so that the whole will balance on the spindle $a$, and attached to the arm F and the upright C is the spring S, so adjusted as to turn the arm F against the stop D, the spring being so light and weak that the rays on the vane V may turn the arm away from the stop a distance varying with the strength of the rays received on the vane. The arm F and vane V are preferably made of aluminum, so as to be light, and the vane V has one side or face smoked or covered with lamp-black, so as to absorb the rays that may come upon it, while the other side or back is highly polished to reflect such rays as may fall upon it. The standard A and frame B and stop D and upright are preferably made of glass, so as not to be affected by the rays. The whole, including the standard, frame, and vane, is inclosed in a bulb or vacuum-chamber M, from which the air has been exhausted, or, if it is found preferable to fill the bulb with hydrogen, it is exhausted to a partial vacuum. The vacuum-chamber M is preferably made in triangular form, as shown, as thereby a glass face or straight side M' is provided for the introduction of the rays to be measured on the vane V. On the curved side of the bulb is arranged a scale, so that the position of the vane V on the scale may be noted and the deflections of the vane compared with one another and with that from one or more standard candles.

Fig. 3 shows a modification of the apparatus, in which the spring S is removed and the magnets T $t$ substituted for it, the magnet $t$ being attached to the arm F, and T fixed to a standard or holder outside of the vacuum-chamber. The magnets tend to draw together and thus keep the vane-arm F against the stop D and resists the action of the rays on the smoked side of the vane V.

Another modification is shown in Figs. 4 and 5, wherein the vane-arm F is hung at or near one end on the spindle $a$ in such a manner that it is free to turn about the spindle, so that the vane V hangs down and rests against the stop D, with the smoked and active side toward M, so that rays thrown upon V will tend to throw it back from the stop D against its natural gravitation toward a perpendicular. The scale is marked on the side of the bulb M along the circle described by the comb of the vane V.

The mode of operation is as follows: The apparatus being completed and the scale marked from a standard light, the light to be tested is brought in front of M' of the vacuum-chamber and the deflection of the arm F noted. When it is desired to measure light-rays proceeding from a luminous body, a screen is interposed between the source of light and the radiometer, which will allow only light-rays to pass through, and when it is desired to measure the heat-rays alone a screen is interposed between the source of heat and the radiometer, which will separate the light-rays and allow the heat-rays only to pass through. The substances employed to separate light and heat rays are so well known to the scientific world as to need no particular description or specification.

I am aware that radiometers have been made in which the arms of the fly rapidly revolve, and that the number of revolutions have been used as a measure of heat or light; but the difficulty of counting the revolutions makes this form of apparatus most unreliable.

What I claim as new, and desire to secure by Letters Patent, is—

1. The method of measuring heat-rays or light-rays, which consists in subjecting the arm of a radiometer to the action of a yielding retracting force, separating the rays to be measured from all other rays, and allowing them to fall upon the vane of the radiometer and measuring the deflection of the arm.

2. In a radiometer, the combination of a vane suspended on an arm, with a retracting-spring attached to the frame, substantially as specified.

3. In a radiometer, the combination of a vane suspended on an arm attached by a retracting-spring to the frame, and a stop, substantially as specified.

4. The combination, in a radiometer, of a vane suspended on an arm attached by a retracting-spring to the frame, and a scale to measure the deflection, substantially as specified.

C. DESHLER.

Witnesses:
HORACE M. ENGLE,
GEO. F. BALLOU.